United States Patent
Prinstil et al.

(10) Patent No.: US 12,080,979 B2
(45) Date of Patent: Sep. 3, 2024

(54) DIRECT CONNECT UEI CARTRIDGES FOR DC POWER SYSTEMS

(71) Applicant: Ambroise Prinstil, East Hartford, CT (US)

(72) Inventors: Ambroise Prinstil, East Hartford, CT (US); Timothy Andrew Gallagher, Canton, CT (US); Taufik Taufik, Santa Maria, CA (US); Jeffrey Scott Gentile, East Falmouth, MA (US)

(*) Notice: Subject to any disclaimer, the term of this patent is extended or adjusted under 35 U.S.C. 154(b) by 214 days.

(21) Appl. No.: 17/832,974

(22) Filed: Jun. 6, 2022

(65) Prior Publication Data

US 2022/0399688 A1 Dec. 15, 2022

Related U.S. Application Data

(60) Provisional application No. 63/210,001, filed on Jun. 12, 2021.

(51) Int. Cl.
*H01R 24/76* (2011.01)
*H01R 25/00* (2006.01)
*H02J 3/38* (2006.01)

(52) U.S. Cl.
CPC ........... *H01R 25/006* (2013.01); *H01R 24/76* (2013.01); *H02J 3/381* (2013.01); *H02J 2300/24* (2020.01)

(58) Field of Classification Search
None
See application file for complete search history.

(56) References Cited

U.S. PATENT DOCUMENTS

| | | | |
|---|---|---|---|
| 10,038,283 B2 * | 7/2018 | Oddsen | H01R 24/78 |
| 10,243,368 B2 | 3/2019 | Prinstil et al. | |
| 10,938,237 B2 | 3/2021 | Prinstil et al. | |
| 2021/0036473 A1 * | 2/2021 | Moore | H02G 3/14 |

* cited by examiner

*Primary Examiner* — Tho D Ta

(57) ABSTRACT

Here presented is a series of Direct Connect Unifying Electrical Interface (UEI) based Cartridges (DC-Cartridges) or (DC-Outlets) created to deliver DC electricity originating from a DC-Homegrid System or any independent DC source. They offer a pathway for higher level DC delivery into a building. The DC-Cartridge series is constructed to unmistakably and easily be distinguished between other power delivery outlet formats used in other AC or DC arrangements. This series of cartridges is designed to offer higher DC power level output to a connected device as used in a home, commercial, and industrial applications. This would facilitate the integration of alternative energy supplies in the DC format for heavy load equipment, essential for the DC infrastructure of the future. The DC Cartridges can deliver power levels similar in fashion to the existing AC connectivity. Following in the standard set by the AC infrastructure, various DC levels are offered. A DC cartridge is offered to differentiate between each power level. Nomenclatures such as DCL, DCM and DCH are introduced to distinguish the various cartridge types and levels to set each apart from the other in the DC-Cartridge UEI based family.

28 Claims, 14 Drawing Sheets

1324 / 1354 / 1384

| UEI MODE KEY E=TOP F=BOT (EF) | UEI FEATURE KEY DCBA (Front View) | MODE | DESCRIPTION | CARTRIDGE FEATURE KEY ABCD (Back View) | CARTRIDGE MODE KEY E=TOP F=BOT (EF) |
|---|---|---|---|---|---|
| 10 | 0001 | DELTA | ½ SYSTEM VOLTAGE (Limited) | 1000 | 10 |
| 10 | 0010 | DELTA | SYSTEM VOLTAGE (Limited) | 0100 | 10 |
| 10 | 0011 | DELTA | 3-PHASE / SYSTEM VOLTAGE / ½ SYSTEM VOLTAGE / HIGH LEG | 1100 | CART-DEP |
| 11 | 0101 | DELTA | LOW HYBRID DELTA AC 125V / DC 24V | 1010 | CART-DEP |
| 11 | 0110 | DELTA | MID HYBRID DELTA AC 250V / DC 96V | 0110 | CART-DEP |
| 01 | 0001 | WYE | PHASE VOLTAGE | 1000 | 01 |
| 01 | 0010 | WYE | SYSTEM VOLTAGE (PHASE V. * √3) | 0100 | 01 |
| 01 | 0011 | WYE | 3-PHASE / PHASE VOLTAGE / SYSTEM VOLTAGE (PHASE V. * √3) | 1100 | CART-DEP |
| 11 | 0101 | WYE | LOW HYBRID WYE AC PHASE V. / DC 24V | 1010 | CART-DEP |
| 11 | 0110 | WYE | MID HYBRID WYE AC SYSTEM V. / DC 96V | 0110 | CART-DEP |
| 11 | 0100 | DC-300/96/24V | DC 300/96/24 VOLTS (Full) | 0010 | CART-DEP |
| 01 | 0100 | LOW DC-24V | DC 24 VOLTS (Limited Low) | 0010 | 01 |
| 10 | 0100 | MID DC-96V | DC 96 VOLTS (Limited Mid) | 0010 | 10 |
| 00 | 0100 | DC-300/500V | HI-DC 300/500 VOLTS (High capacity equipment/Level 3 EV Charging) | 0010 | 00 |
| 00 | 1000 | SWITCHES | DC SWITCHES | 0001 | 00 |
| 01 | 1000 | SWITCHES | SWITCHES REGULAR SINGLE | 0001 | 01 |
| 10 | 1000 | SWITCHES | SWITCHES 3-WAY | 0001 | 10 |
| 11 | 1000 | SWITCHES | SWITCHES 4-WAY / DOUBLE GANG REGULAR | 0001 | 11 |
| 00 | 1001 | SPECIAL-AC | AC POWERED SPECIAL FUNCTION | 1001 | 00 |
| 00 | 1100 | SPECIAL-DC | DC POWERED SPECIAL FUNCTION | 0011 | 00 |
| 10 | 0000 | LIGHTS-AC | AC POWERED LIGHTS | 0000 | 10 |
| 01 | 0000 | LIGHTS-DC | DC POWERED LIGHTS | 0000 | 01 |
| 11 | 0000 | DATA | DATA | 0000 | 11 |

UEI 0 = CLOSED CAVITY  
UEI 1 = OPEN CAVITY

CARTRIDGES: 0 = NO PEG 1 = PEGGED  
CART-DEP = CARTRIDGE DEPENDENT

TABLE 1

FIG. 18

DIRECT CONNECT UEI CARTRIDGES FOR DC POWER SYSTEMS

PRIORITY CLAIM

The application described within claims the benefit of U.S. Provisional Patent Application Ser. No. 63/210,001, filed Jun. 12, 2021, which application is hereby incorporated by reference.

FIELD OF THE INVENTION

The present invention relates to a series of Direct Connect Unifying Electrical Interface based Cartridges (DC-Cartridges) or (DC Outlets) to work in conjunction with a DC power delivery system, DC-Homegrid or any independent DC source.

BACKGROUND OF THE INVENTION

With the introduction of the Unifying Electrical Interface (UEI) connection platform, now U.S. Pat. No. 10,243,368, and the DC-Homegrid system for power distribution U.S. Pat. No. 10,938,237, both incorporated by reference, came the opportunity to introduce a series of complementary cartridges intended for taking full advantage of that UEI/DC-Homegrid platforms forming a complementary element making up the DC infrastructure. The UEI offers the ease of delivering a multiplicity of power alternatives, Alternating Current (AC) and/or Direct Current (DC), into a building. As such, along with the DC-Homegrid, they will extend to end users access to a broader DC supply capability herein.

The world over, the standard is fully developed for AC power delivery. However, DC still requires new standards to be developed to take full advantage of the multiple delivery options available for the consumer to access. This patent will address that need.

This patent seeks to introduce a family of Direct Connect UEI based DC-Cartridges as outlets for various modes of DC power connectivity. With this innovative invention, a worldwide unifying standard for DC is provided upon which countries can agree to avoid a repeat of the mistakes of the past and thus, eliminating the incompatibility that presently exists with AC, each country having adopted its own standard. Adoption of the UEI based Direct Connect power outlets will make full use of the UEI as a single standardized environment for DC power delivery. A non-UEI DC-Outlet is also envisioned whereby conventional wire connection standards are utilized with the DC-Outlet and infrastructure.

A disadvantage associated with AC power is its long-range transmission. The vulnerable nature of this transmission has become concern and fear that many have of the disastrous effect of natural disasters or criminal attacks on the power grid. As a remedy, this patent seeks to leverage the use of Direct Current (DC) by way of the DC-Homegrid and the UEI systems for power distribution. Power produced in nearby locations such as solar panels, fuel cell micro powerplants, geothermal farms or any other renewable and/or sustainable method of energy generation can, by way of the DC-Homegrid be sent to the UEI for direct use as DC. Each house or building would thus take advantage of its own DC power generation in complete isolation from the current AC power grid.

As is well known in the electricity industry, the existing power connectivity infrastructure is setup to work with AC only. As such, to take advantage of using DC directly, a new infrastructure is needed to facilitate connecting to a DC supply. The limitation of only having an AC infrastructure in the home or building leaves the power consumer vulnerable and without electricity if anything happens to the AC power grid. If they don't have a conventional generator but do have access to a renewable energy source, power generation is turned off automatically. Use of DC in a building does offer the added advantage of having an alternate power stream that is isolated from the AC power grid. Additionally, many of today's devices operate on DC which need to be converted from AC into DC for them to work. Having an isolated dual power source infrastructure in place can be compared to having the hot and cold-water lines implemented in the home; and all can attest to the benefits that have been derived in having both water streams in the home. Likewise, separating the AC path from that of the DC and creating two distinct power streams allows the user, by way of the UEI platform and the DC-Cartridges, to retain power functionality in the event of a natural disaster or a criminal attack (cyber-attack) on the exposed AC power grid. This is possible if the building is equipped with a separate DC alternative to maximize efficiency by taking DC directly from the source without the need for multiple conversion steps, hence, Direct Connect (DC-Cartridges or DC-outlets).

Most modern electronic and battery-operated devices need recharging. Examples include electric vehicles, power tools, automotive tools, lawn and garden equipment, grooming devices, hygiene and of course the many computing and communication devices used every day. Some of these items operate in either the DCL or DCM voltage ranges, others may take advantage of the higher power DCH and beyond. They all have an underlying need of a DC charger to charge the battery inside the devices. The existing standard in place requires the conversion of AC into DC. By way of the proposed DC-Cartridges, the ability to have different levels of DC voltages and power levels delivered directly to DC equipment and devices becomes possible. In-line with the cartridge, the plug, or onboard of the equipment using the power, a simple energy efficient DC to DC converter can be implemented to facilitate using the DC directly, thus removing the need of bulky power supplies.

Photovoltaic energy generation, which is one of the most widely utilized alternative energy technologies used for home power generation, produces a DC voltage. However, due to the adopted conventions for power delivery, before using that DC electricity, it needs to be inverted to AC by means of power inverter units. That inversion takes place even in the case where the generated power is stored in large batteries prior to being used. However, most equipment in use, even when it is equipped with an AC plug, does have an internal power supply that converts the AC voltage back into DC. One of the many aims of this patent is to offer avenues and means of taking advantage of the generated power without having to go through the many inversion and conversion processes. This results in energy saving for the end user and reduced strain on the conventional grid.

The world having adopted the current AC infrastructure in buildings brings us to the present with no standardized, dedicated DC delivery infrastructure. As a result, people in need of utilizing DC have resorted to some unregulated, non-standard, and unacceptable means of connectivity to the DC line by employing outlets adapted for the AC space. This calls for a need to have a dedicated and robust DC infrastructure and connectivity in the homes or any commercial/industrial buildings, hence the need, value and safety for the DC-Cartridge series is recognized. The UEI based system enables the implementation of the Direct Connect series of cartridges. Without it, there will be even greater confusion if DC was to continue to be delivered using the same equipment or outlets as is presently being used for the AC. Our aim is to introduce this series of Direct Connect family of outlets with differentiating features and nomenclatures such as: DCL, DCM and DCH that are customized to work with various DC levels and which will leave no doubt as to what they are intended for, removing all confusion between an AC outlet for AC and that of a DC outlet being used for DC.

With today's existing distribution infrastructure, where a single AC voltage is delivered to an outlet port, the DC Homegrid in conjunction with the UEI platform which are both referenced in this patent, will offer a broader variety of power levels at a single port. All that variety can be made available simultaneously and it will be at the discretion of the consumer to take advantage of the desired power level by simply replacing the cartridge to another one making connection to a different output level, thereby broadening the choice made available to the consumer from a single outlet location.

The ability to safely and easily install an outlet cartridge using the Unifying Electrical Interface creates a possibility that enables converting to a UEI based DC-Cartridge system a very versatile and appealing approach. In most cases, the change can easily be made without tools or the need to de-energize the line. This can be accomplished by any responsible adult, to the extent that they follow the instructions provided by the manufacturer. The simplicity of the UEI system enables effortless installation and makes it safe and easy to replace DC cartridges as needed.

As already stated, the principal aim of this invention is to leverage the versatility of the Unifying Electrical Interface (UEI) to extend DC connectivity by way of a series of Direct Connect DC-Cartridges to the consumer. Doing so gives access to different types of DC supplies and levels via the Direct Connect Homegrid system. This can be achieved by simply changing the cartridge connected to the UEI base if the base was previously wired to offer the multiple power levels. This all can be achieved with the same confidence and effortlessness that exists today with inserting an AC plug into a wall outlet.

SUMMARY OF THE INVENTION

To enable connectivity to an AC electrical system, the convention of using an outlet as currently done throughout the world is well established. However, for DC use, the standard is not yet established, and the time is ripe to provide a standard that eventually will be adopted universally to make direct connection to DC power and thereby helping to establishing the DC infrastructure of the future. As already stated, the proposed DC-Cartridges will facilitate the implementation of a new convention.

At the DC-Homegrid system, various levels of DC are proposed to be delivered according to the need of the consumer. To help differentiate between them, nomenclatures such as DCL-Voltage for a low-level DC output capable of providing a voltage of approximately up to 48V DC and up to around 15 Amperes per line is presented. A DCM-Voltage is also proposed to satisfy increased DC power needs. The DCM-Cartridge power output can provide voltages ranging from 49V up to 96V DC at approximately 20 Amperes per line, the equivalent to about twice or more the power output level of the DCL. This will satisfy the higher power demand capable of driving a mid-size equipment power need. Still following in the convention left by the AC infrastructure, a DCH-Cartridge is also proposed capable of providing DC voltage of up to around 300V at approximately 50 Amperes able to drive even higher loads.

The flexibility of switching to various levels of DC makes it possible to have the ability to sufficiently power multiple lower-level loads simultaneously. It also can deliver sufficient power for even some very demanding loads. When powered with DC, some equipment such as high-end stereo systems will have many advantages over the AC powered devices. Benefits include size and weight reduction, minimizing heat generation and cost of manufacturing, potentially reduced cost to consumer; and best of all, lower noise resulting in a cleaner sounding audio system. The latter benefit is the reason why some high-end audio equipment manufacturers have opted to produce a separate DC block to power their audio equipment since the result produces a better sounding system, at a much higher cost. With the proposed DC-Cartridge for power delivery working in conjunction with a UEI base connected to a DC-Homegrid system, such benefit will be extended to all equipment not just a few selected, very expensive units.

The advantage of having any of the enumerated DC connectivity in place goes far beyond obtaining a better sounding stereo system. It extends a much greater benefit which consists of having an avenue to retain power in a blackout situation if a building is equipped with a DC-Homegrid system. Adoption of such a system, however, does not in any way call-for total rejection of the existing AC platform. As a result, a combination AC/DC hybrid UEI base makes available even greater choices and flexibility to the consumer.

A building wired for use with a Unifying Electrical Interface platform which is connected to a DC-Homegrid system provides all that is needed for implementation of the DC-Cartridge system. Now, the consumer can install the needed or intended cartridge to the appropriate base to make available the desired DC level to a given location. The internal connection of the outlets and their active Terminal-Hooks will determine which of the voltages available at the UEI base will be made available to the consumer. If only a DCL line source is wired to an interface, inserting a DCM cartridge to it will not operate at all, if by accident it was able to be connected to the base. Making that connection is by design not permissible due to a cross-insertion key feature implemented between the UEI platform and the DC-Cartridge. To facilitate in the identification of such UEI's thus preventing someone from inadvertently inserting a wrong cartridge into a UEI, a matching key feature provision, mechanical, magnetic, jumpers or electronic such as RFID or optical such as Opto-Coupler or any other such "lock & key" fit/identifier that may be available now or in the future and employed for such purpose, is built into both the UEI base platform and its intended cartridge outlet unit to safely facilitate in the connection process. When properly implemented, cross-insertion of a component subset adapted for a DCM-Line cannot be accidentally inserted into a UEI base platform intended for either a DCL line or a DCH or AC line, making the implementation of the system safe and foolproof.

Along with the benefit of switching between power levels offered by the ease of replacing new outlets, comes the advantage of energy conservation offered by having a DC-Homegrid system connected to the UEI platform. When properly implemented, the benefit of not having a charger/transformer connected to the AC line, which continuously consumes electricity even when not in use, is thereby eliminated. DC coming either directly from a source such as a solar power generation system, a fuel cell system, a battery storage or simply from any DC supply source such as a gasoline, propane, or natural gas generator, can thus be provided to the DC-Cartridge by way of the UEI base.

In the quest for energy independence and cleaner environment, many sought to invest into alternative energy technologies. This approach, however, still at the final stage, uses the existing AC infrastructure which does not provide the ability to use the power generated by some alternate energy source, directly. That obtained power is often is in the form of DC and needs to be inverted into AC prior to being used by the customer. This is due to the lack of infrastructure and technology in place to take advantage of generated DC directly. The UEI and the DC-Cartridge make it possible to have DC brought in directly to the consumer. As such, having an AC and DC (Hybrid) powered home or building is possible. The ability to have DC at the outlets does not eliminate the choice of inverting the major portion or some of the generated DC into AC to place it onto the power grid to buy it back at nightfall.

Having the availability of battery storage working in conjunction with the UEI helps the user maintain power when they might otherwise be without. The Direct Connect Cartridge series in conjunction with the UEI platform and the DC-Homegrid system provides a connectivity path for the generated DC energy to be used without having to be inverted into AC first.

When a building is connected to the AC power grid, all excess energy obtained from a renewable energy source is placed onto the grid, as a result AC power generation is interrupted to prevent the line from remaining active and becomes a safety hazard to a repair crew when repairs are needed. Although that safety system should and will remain, when the UEI based system is used, the home does not go completely without power because the UEI provides an isolated and independent DC path resulting in the building being able to retain power operation where otherwise the electricity would have been interrupted.

The ability to retain power functionality in the event of a natural disaster is useful for the homeowner. An independent DC path will keep a great percentage of equipment in the home functional. The separation provided with the UEI ensures that the DC power is safe and completely isolated from the AC side, thereby safeguarding the utility company crew repairing the line. In remote regions, where there is no conventional AC power grid to be connected to, the home can be a simple DC operated home bypassing all the inversion and conversion processes and the loss associated with them.

BRIEF DESCRIPTION OF DRAWINGS

Here presented is the best mode of constructing this family of DC-Outlets herein. A full disclosure of the present invention found in this specification will enable anyone skilled in the art of fabricating such equipment and product to have sufficient understanding of the subject matter hereby disclosed and referenced by the accompanying drawings, where:

FIG. 18 is a Key-Matrix Table representing the various cartridge combinations that can be adapted to a UEI base. Among them are the DC-Cartridges used in this patent.

DETAILED DESCRIPTION OF THE INVENTION

While connectivity to a power source may take many forms, the adaptations found in this invention may be construed as one of the many embodiments of the Direct Connect UEI Cartridge family (DC-Cartridge) as employed in this patent. Many similar approaches may be derived from this that will not be covered in this application but will, regardless, represent the intent of this patent to illustrate the method of connectivity necessary to form a DC infrastructure to deliver DC power into a home, building or any place utilizing electricity. The components to be described in this preferred embodiment, will exhibit many elements that, when taken together, will be found to be essential to explain the design intent.

Conventionally, AC connectivity in any given country uses multiple types of outlets to differentiate the power level being connected to. Throughout the world however, even for an AC voltage level like that used in different countries, they have adopted their own standard of power connectivity requiring different outlet types. That being the case, one encounter many different types of outlets for the AC space. The same will partially be true for the DC infrastructure since the intent is to produce different power levels and to find a way to distinguish between them. Hopefully, the variations here presented will set the standard to be adopted the world over minimizing the confusion of having multiple DC standards throughout the globe.

In this patent three different models of outlets are being proposed. Each model is adapted for a different voltage range and power level. A distinctive nomenclature is established to differentiate the various cartridges; DCL-Cartridge 1310 for a low power cartridge, DCM-Cartridge 1340 to provide an intermediate power output, and DCH-Cartridge 1370 for a moderately high-power output. The Unifying Electrical Interface (UEI) 10 is at the heart of this connectivity system. It is a platform that takes the shape of a multi-channel outlet that provides pathways to either single mode connectivity or a combination thereof. Instead of being a singular source of power, it allows the choice for a wider selection of voltages and types. Thus, its adoption for the Direct Connect cartridges, enabling direct current DC power to be delivered into a building or anywhere electricity is used.

Figure 1:
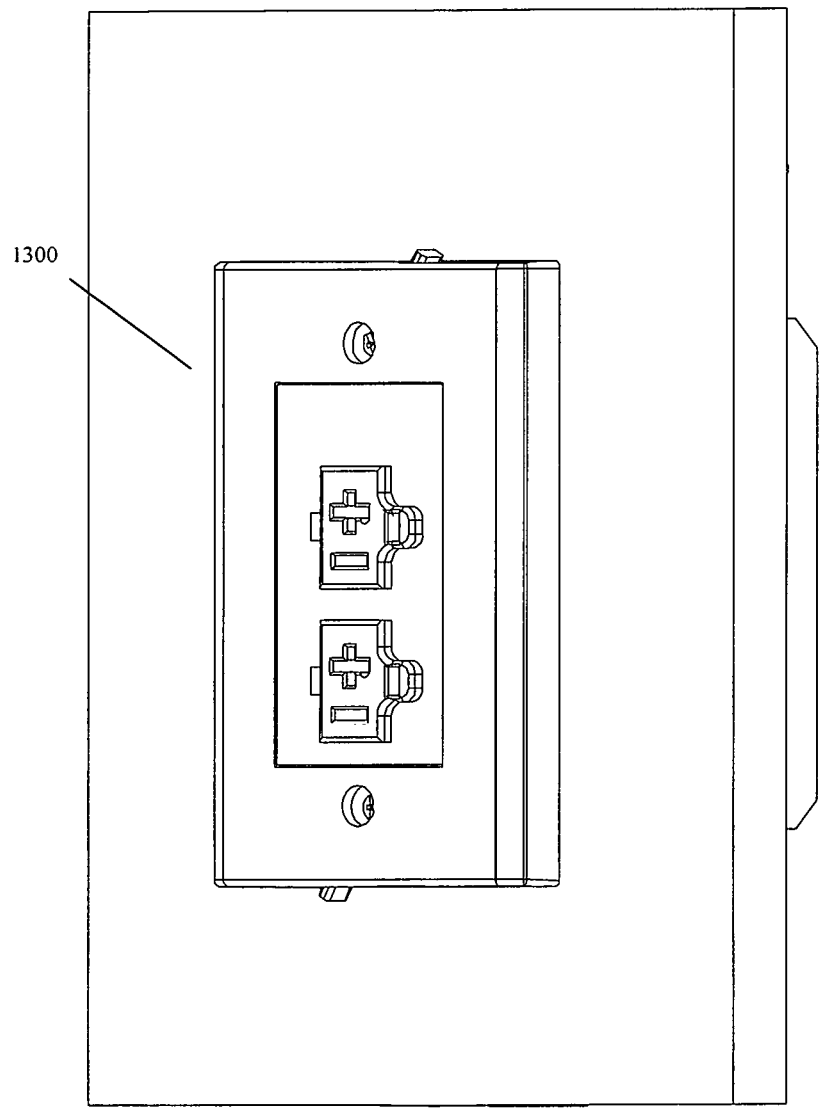
FIG. 1 is the basic representation of a DCL-Cartridge fully installed as a low voltage DC wall outlet.

FIG. 1 illustrates a complete assembly of a DCL-Cartridge in the 1300 group of cartridges that are intended to be installed in a standard form factor UEI that can be used throughout a building. That assembly as shown, is represented installed on a wall showing a set of outlets in the convention set by the AC standard. The noted outlets at first sight may appear similar with the AC but upon close examination will be noted to have a different pin arrangement than those of the standard AC outlets. As such would not accept any of the power plugs used by the AC connectivity standards.

Figure 2:
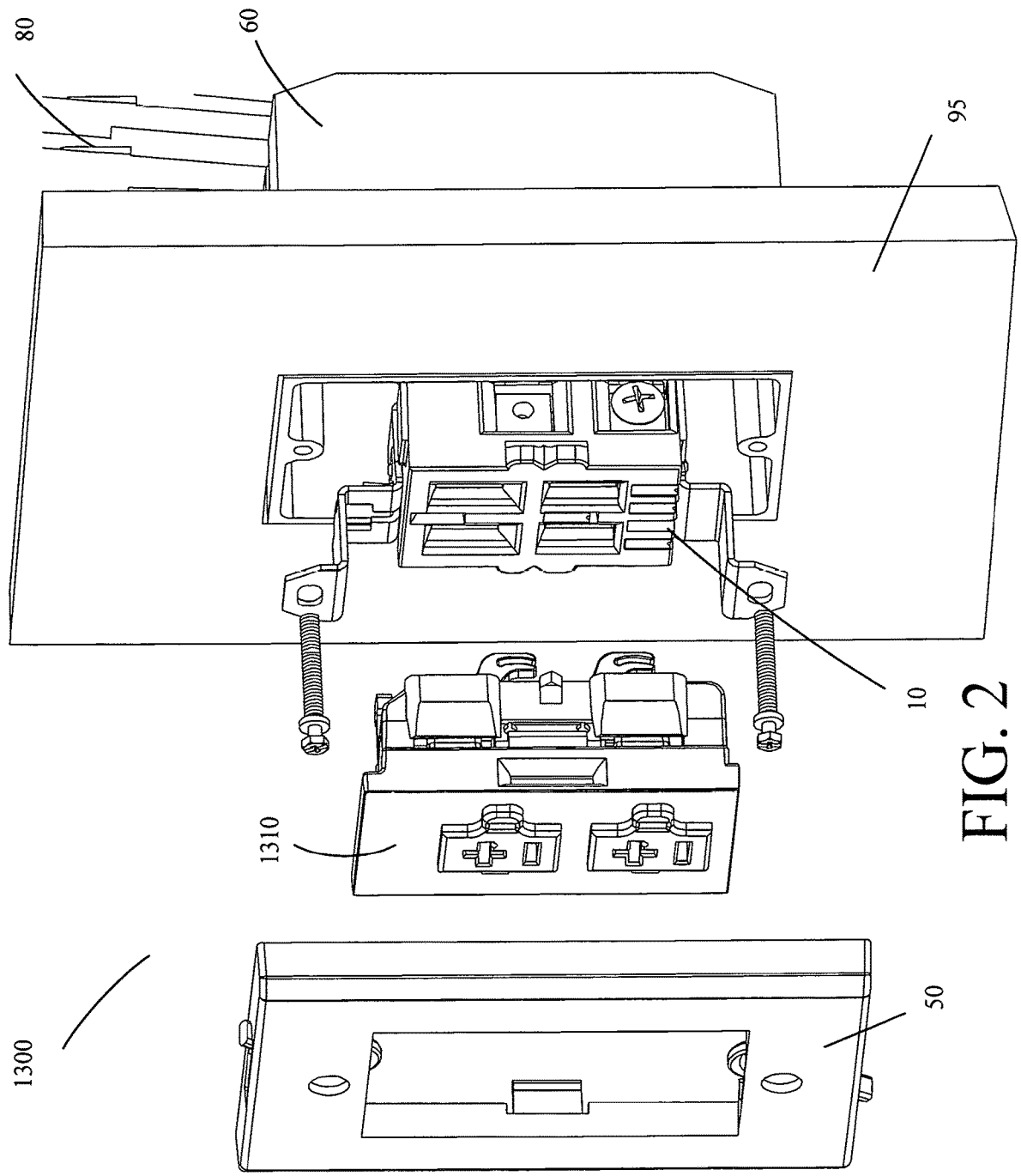
FIG. 2 is an exploded assembly view of a DCL-Cartridge showing the cartridge entering the UEI base followed by the Faceplate. The assembly is shown entering a conventional electrical wall box.

The assembly of an outlet is represented in FIG. 2 where all the elements necessary to construct that delivery platform is shown. From the wall 95 is installed an electrical wall box 60 identical to the type used in the AC infrastructure. Into that box is mounted the UEI base 10 customized for a 1310 DCL-Cartridge seen as the next element entering the assembly. Lastly, the Faceplate 50 completes the assembly. That configuration when used in a building equipped with a Direct Connect Homegrid system can make available to the consumer a line providing up to 48V DC that the consumer can use directly to perform some tasks that would not necessitate any form of power conversion from AC to DC. That availability will satisfy most low power demands in a building involving DC needs. Direct DC demand will increase as more manufacturers develop equipment that can make use of this power delivery format.

As already stated, two other prior developments are used in making possible the deployment of the Direct Connect family of cartridges (DC-Cartridges). The first is the patented UEI platform 10 U.S. Pat. No. 10,243,368, that allows connectivity in many forms permitting distribution of electricity in either format AC or DC and the possibility of providing different power levels of a particular format concurrently. The opportunity to provide both power formats AC and DC simultaneously is also made possible using that patented UEI platform. The second element the Direct Connect Homegrid 800 illustrated in FIG. 3, now U.S. Pat. No. 10,938,237, facilitates the deployment of the family of DC-Cartridges for the DC infrastructure. That DC-Homegrid would receive its power from any near proximity renewable energy source and process it directly to be used while still in the DC format without having to be inverted to AC. The combination of those cited developments form initial integral parts for the DC infrastructure. Having introduced these necessary elements, next in the line is to have a method to provide connectivity to the DC supply, thus the DC-Cartridges from this patent.

Figure 3:
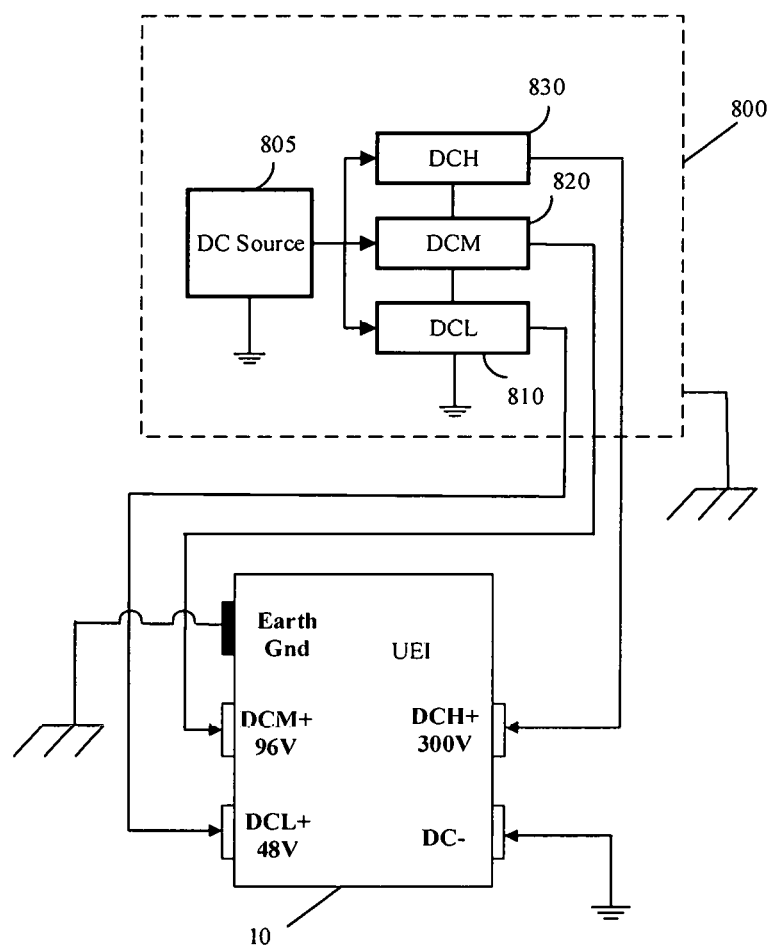
FIG. 3 is a simplified block diagram representation of a UEI base wired to a DC-Homegrid providing three different DC levels, a DCL, a DCM and a DCH all wired concurrently to a single UEI base.

The DC-Homegrid system illustrated in FIG. 3 is shown to represent three levels of DC at stages 810, 820 and 830 where respectively increasing power output would be derived to be wired to UEI bases and from there made available to be accessed by way of specifically intended DC-Cartridges.

Most small equipment uses a voltage level below 24V DC and as a result having a DCL presented as approximately up to 48V DC is sufficient to satisfy the demand for driving most very small equipment. In most cases, the level needed is only in the range of 5V to 18V DC. Then, prior to making use of the power from that low-level power port, there will be a secondary DC to DC regulation to limit the level outputted to that equipment. Currently, such regulation already exists as a protection added to any equipment. A DCL line capable of providing up to 48V DC at a current level not to exceed 15 Amperes will be sufficient to share amongst many small devices simultaneously from any given DCL line. To protect against overloading a line, there will be, as in the AC infrastructure, a panel with circuit breakers limiting the current to be obtained from each DCL line to not exceed the set threshold.

Figure 4:
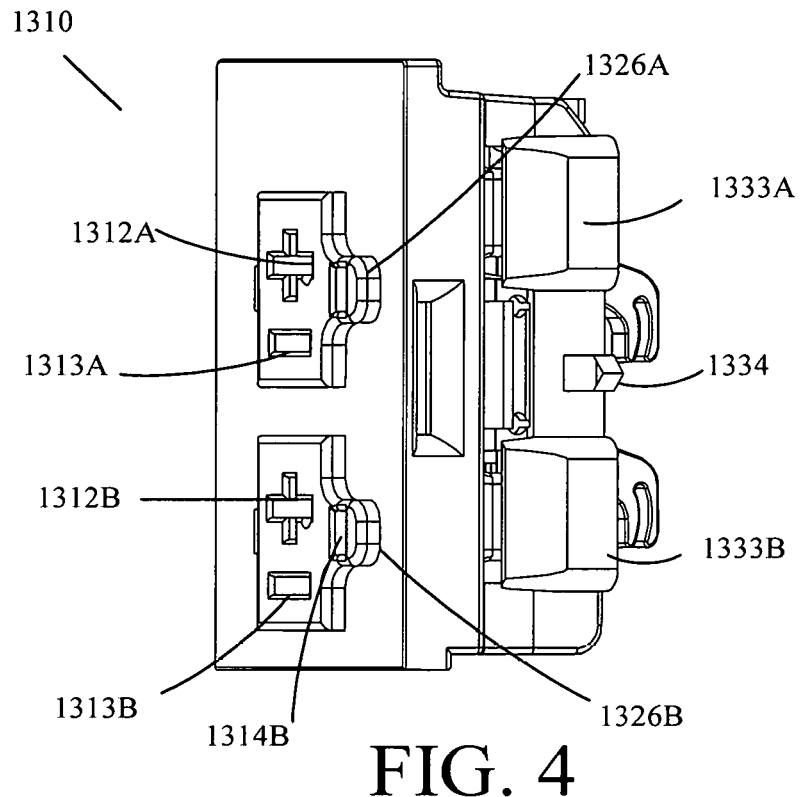
FIG. 4 is a profile view representation of a DCL-Cartridge.

A profile view of a DCL-Cartridge is represented in FIG. 4 where a basic cartridge 1310 configuration is shown. An easy differentiation for a DC cartridge to those of the AC platform is, in this case, represented by the Cartridge Plus-Inlet signs 1312A and 1312B at the Frontal-Body shell of the cartridge indicating the positive entry point of the power source. Likewise, the Cartridge Minus-Inlet signs 1313A and 1313B are represented with simple negative signs situated, in this case, immediately below the positive entry points. Those differentiating signs make the DC cartridges unmistakably identifiable from any AC cartridges. Also following in the footsteps of the AC platform, the DC series of cartridges are shown in FIG. 5 to have a set of Earth Ground-Inlet entry points 1314A and 1314B where connectivity are offered to provide a measure of earth ground security from the cartridges by having features such as ground fault protection included with a particular line.

From this profile view found in FIG. 4 can be seen the Embossed Outlet Frontal-Body shell 1326A and 1326B where an offset to the surface of the cartridge is created which would provide a bump permitting the mating plug to have an overhang that would facilitate insertion of the plug into the outlet. Snap-Guards 1333A and B are also shown representing the total of four protective covers preventing the Cartridge Engagement-Snaps 1317A, 1317B, 1317C and 1317D joining the two halves of the cartridge body or the outlet assembly from coming apart. From this view is also represented the Cartridge Insertion Guide 1334 confirming the complete insertion of a cartridge to its UEI base. Full insertion is monitored by way of a matching arrow in the UEI body needing to be lined up, validating the complete electrical mating of the cartridge to the base.

Figure 5:
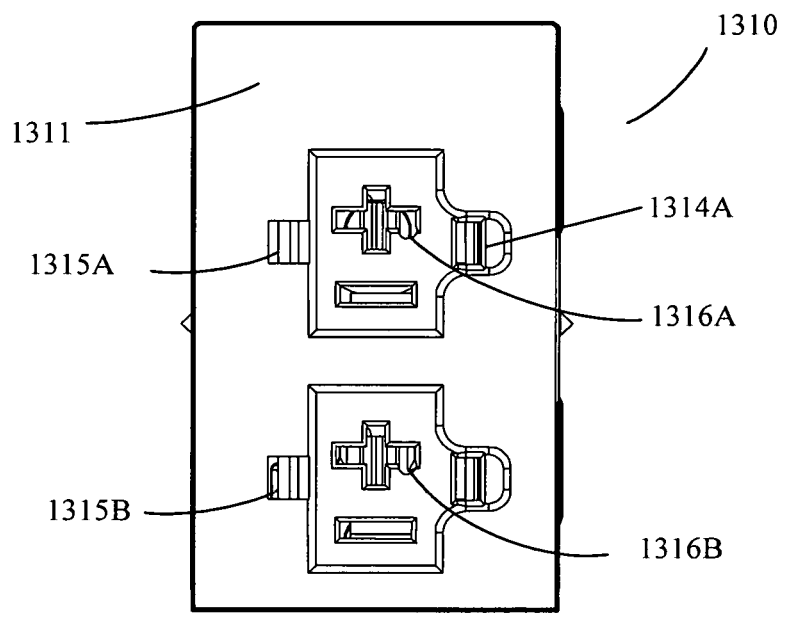
FIG. 5 is a frontal view representation of that DCL-Cartridge.
Figure 6:
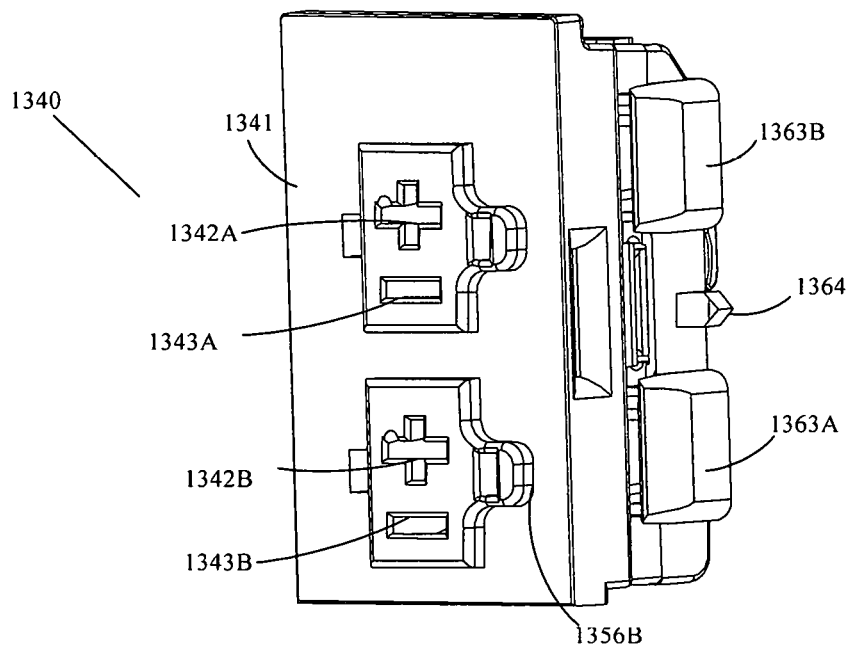
FIG. 6 is a profile view representation of a DCM-Cartridge.
Figure 7:
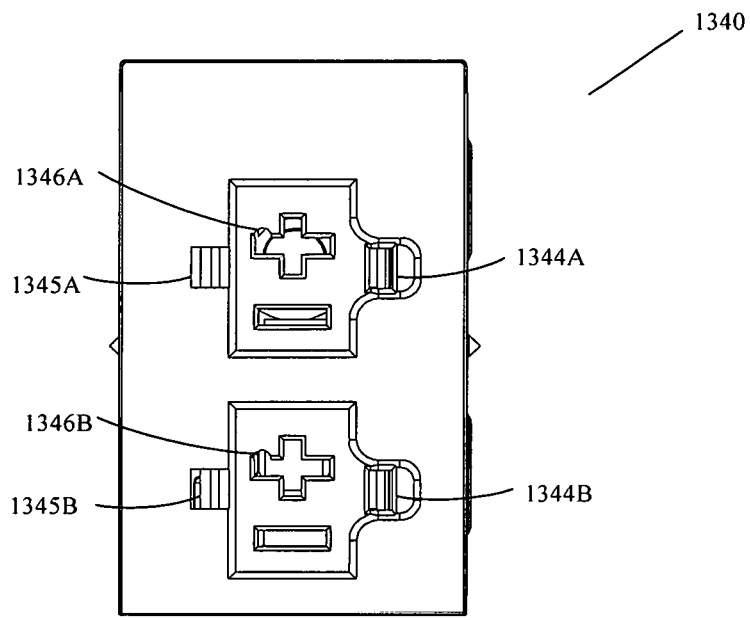
FIG. 7 is a frontal view of that DCM-Cartridge.

The front view of the cartridges seen in FIG. 5 and FIG. 7 reveal distinct features built in every DCL and DCM cartridges to easily inform a user what type of power level can be obtained from a specific outlet. These DCL-Cartridges and DCM-Cartridges are of the same form factor and if not differentiated one could easily be mistaken for the other. Differentiating the outlets will help in protecting equipment from being accidentally overpowered. DCH-Cartridges however are much bigger in size and cannot be used in place of the others and therefore no keying feature is provided for these cartridges. A differentiating key feature is built into the plus signs as an "Inlet-Key Orientation" for the mating plug where a cavity is shown in the horizontal orientation of either the DCL or a DCM series of cartridges identifying the cartridge to the power level that can be obtained. The DCL-Cartridge cavities are here represented as a set of downward facing Inlet Key Orientation openings 1316A and 1316B in the right legs of the horizontal portions of the plus signs. The ones representing the DCM-Cartridge can be seen as cavities facing upward at 180 degrees opposite to those of the DCL-Cartridge. This time they will be found in the left legs of the horizontal portion of the plus signs as seen as 1346A and 1346B in FIG. 7.

Another distinct feature built in every cartridge in the DC family of cartridges is the Plug-Lock engagement feature where inlets are provided to allow some locking tabs from the plugs to engage the cartridge guaranteeing total insertion of the plug to the cartridge base. That tab coming from the plug will engage this entry point and secure the plug to the base. They are nonetheless made to come undone in case someone trips against a power cord to avoid further damage to the assembly. Its purpose is only to secure a connected device in normal operation. The holes for this Plug-Lock Inlet feature are identified as 1315A and 1315B for DCL-Cartridges, 1345A and 1345B for DCM-Cartridges, 1375 for DCH-Cartridges. Same feature can also be identified in the non-UEI base DC outlet represented in FIG. 17 as 1545A and 1545B.

Figure 8:
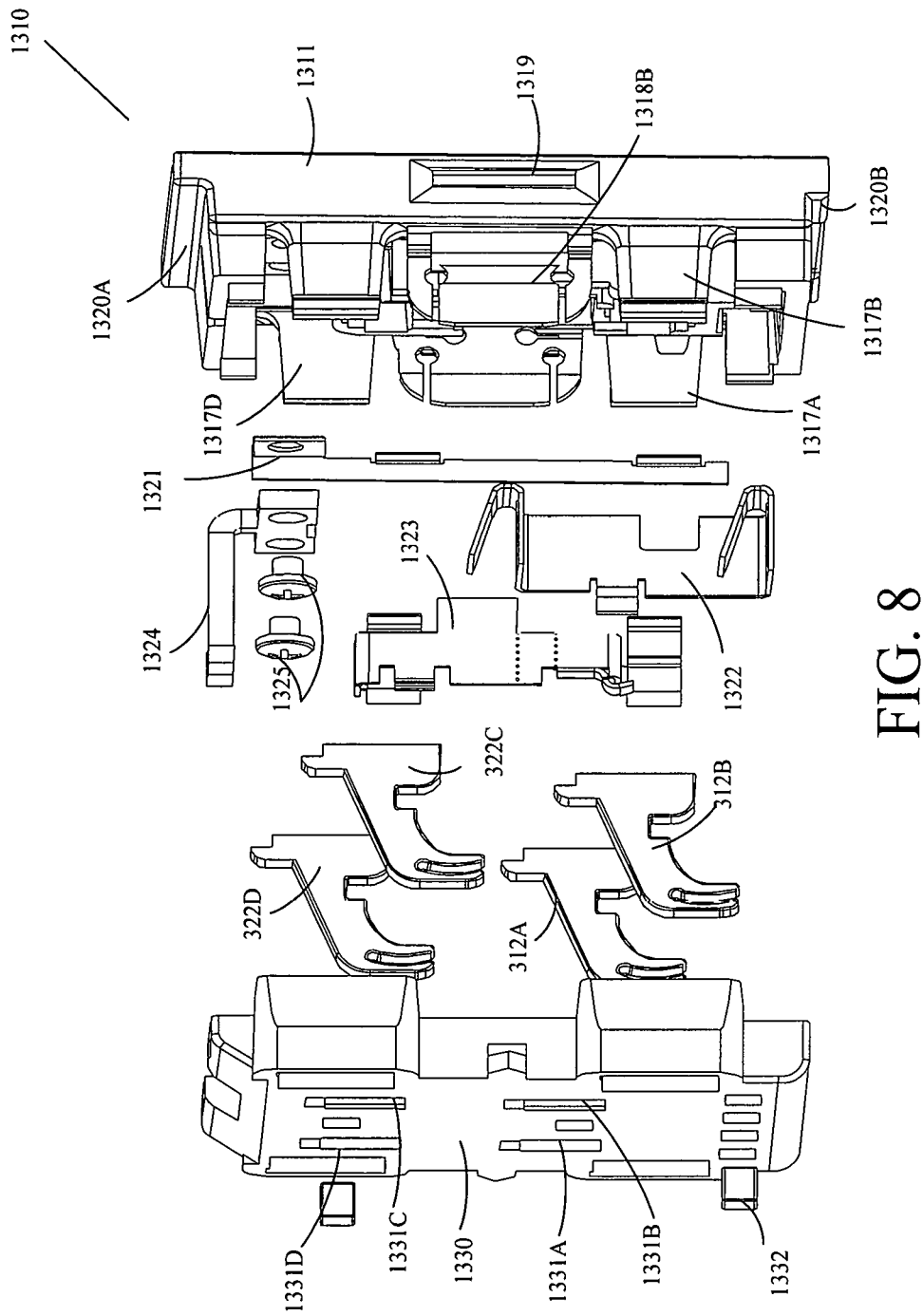
FIG. 8 is an exploded view of a low-level DCL Cartridge. It is identical for the mid-level DCM cartridge. The internal components assembly are shown. The same representation covers both the DCL and the DCM series of cartridges.
Figure 9:
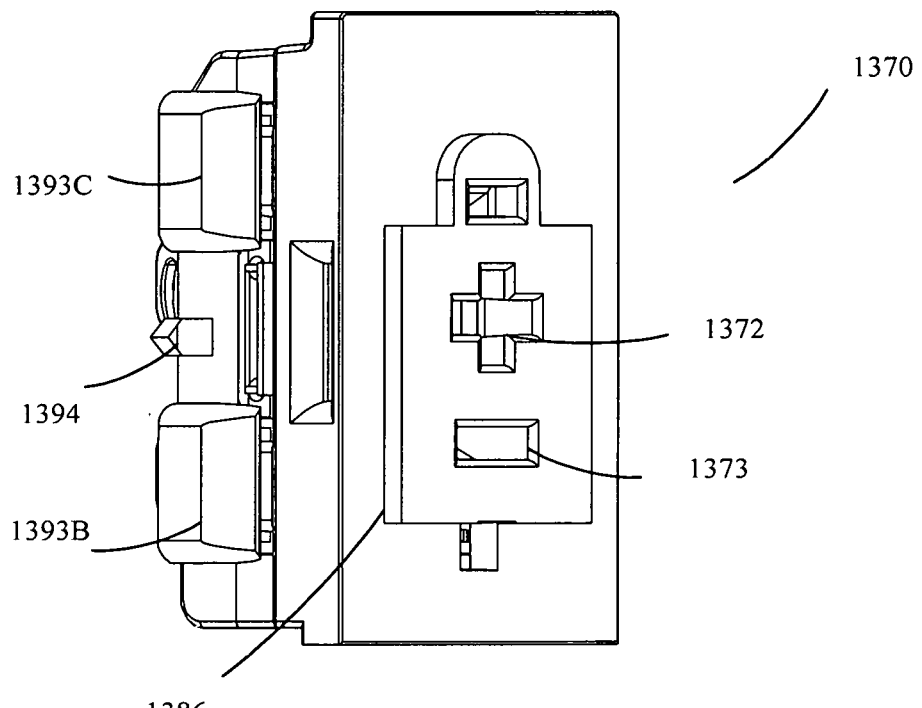
FIG. 9 is a profile view representation of a DCH-Cartridge.
Figure 10:
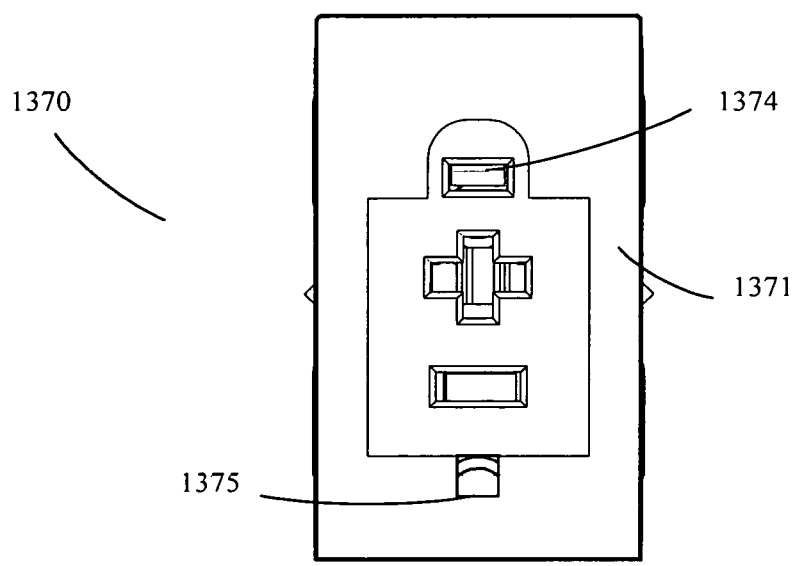
FIG. 10 is a frontal view representation of a high-level DCH-Cartridge.

The construction for the DCL and DCM-Cartridges are for the most part identical. FIG. 8 shows the exploded view of the components making up the cartridges. They are made of two halves each. The Cartridge Housing Frontal-Body shell 1311 is snapped together with the Common-Housing Base 1330 forming a DCL-Cartridge body, and the Cartridge Housing Frontal-Body shell 1341 snaps with the Common-Housing Base 1360 to form the DCM-Cartridge body.

Figure 12A:
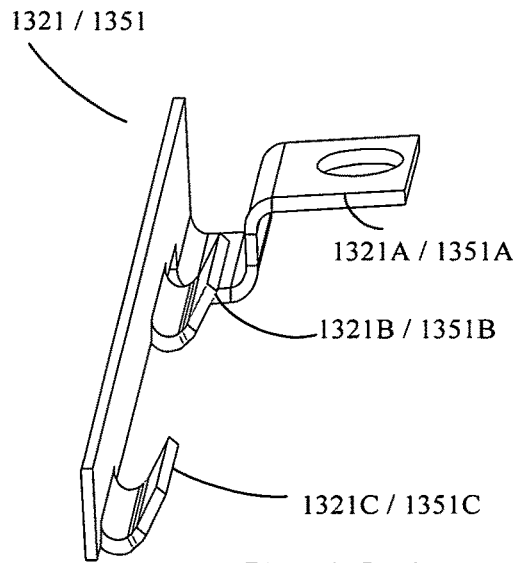
FIG. 12A is a representation of an Earth Ground Electrical Bus Terminal as adapted for DCL and DCM series of cartridges.
Figure 12B:
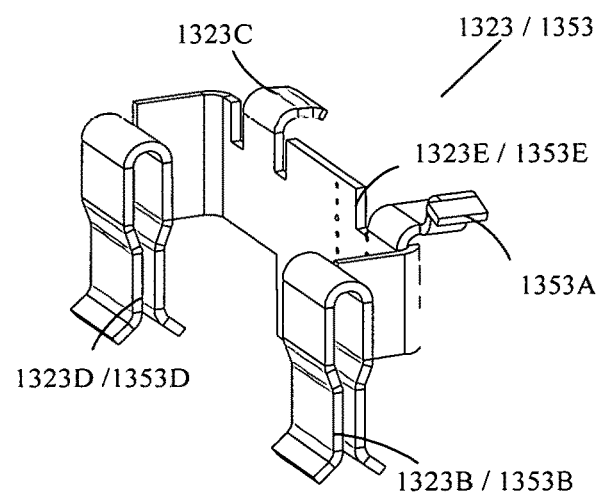
FIG. 12B is a representation of a Positive Electrical-Terminal adapted for DCL and DCM series of cartridges.
Figure 12C:
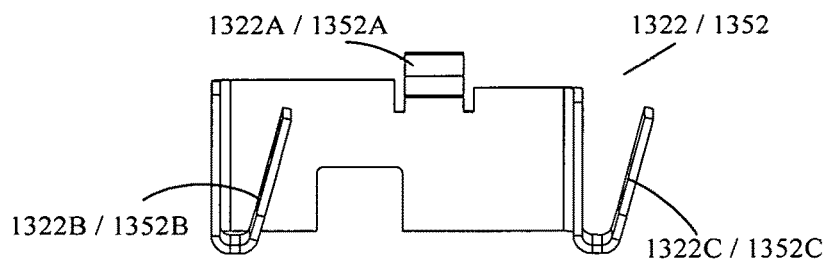
FIG. 12C is a representation of a Negative Electrical-Terminal as adapted for DCL and DCM series of cartridges.
Figure 12D:
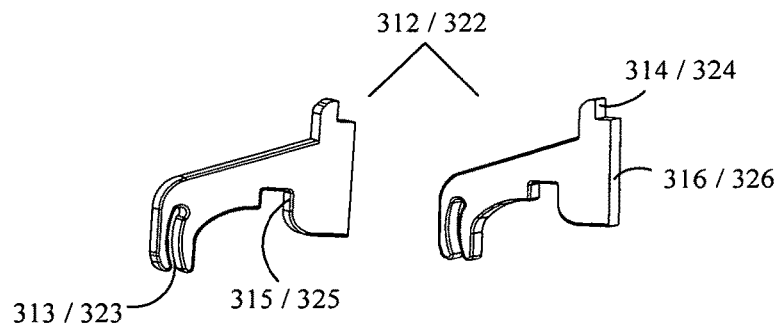
FIG. 12D shows alternate views representing both versions of Terminal-Hooks as used in all models of cartridges.
Figure 13A:
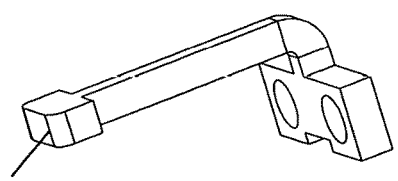
FIG. 13A is a representation of a Grounding-Prong as used in all DC cartridges.
Figure 13B:
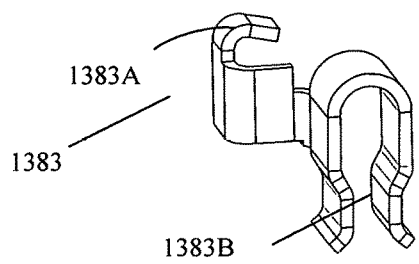
FIG. 13B is a representation of a Positive Electrical-Terminal as used in a DCH-Cartridge.
Figure 13C:
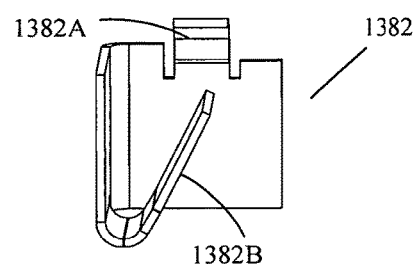
FIG. 13C is a representation of a Negative Electrical-Terminal as used in a DCH-Cartridge.
Figure 13D:
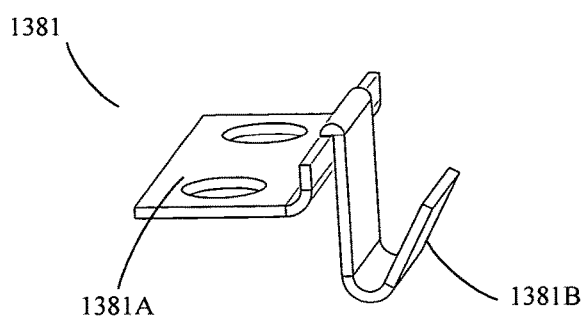
FIG. 13D is a representation of an Earth Ground Electrical Bus terminal as used in a DCH-Cartridge.
Figure 13E:
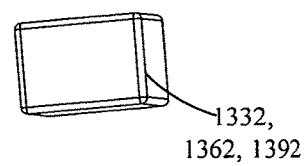
FIG. 13E is a representation of a Key-Peg as used in all cartridges as part of the Cross-Insertion Key feature.
Figure 14A:
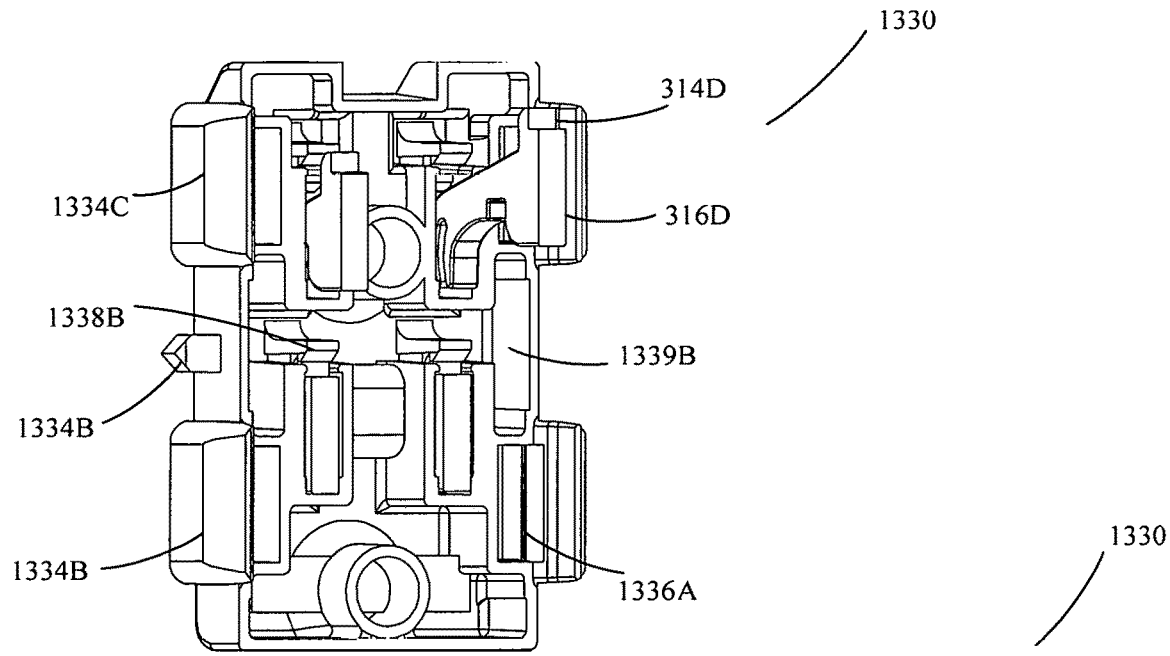
FIG. 14A is a representation of the internal view of a Common-Housing base that forms the back portion of all cartridges.
Figure 14B:
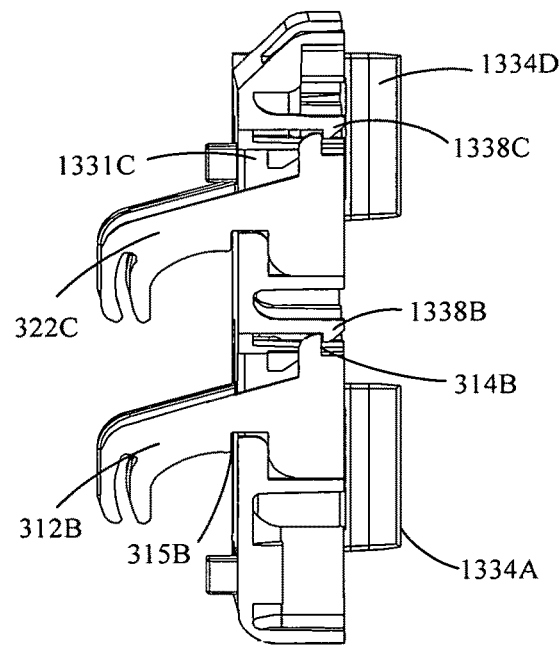
FIG. 14B is a cutaway view of the Common-Housing base of the cartridges further illustrating the insertion of the Terminal-Hooks and their engagement with the Hook-Locking Tabs.
Figure 15:
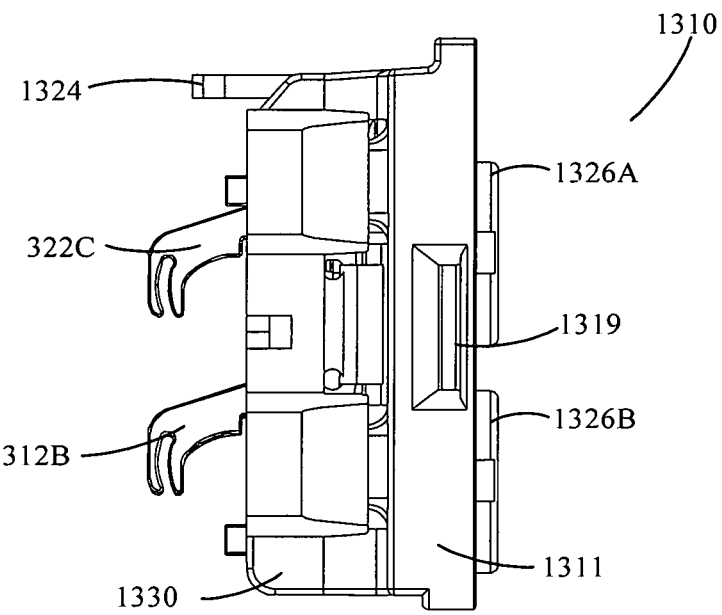
FIG. 15 is a side view of a DCL or a DCM family of cartridges.
Figure 16:
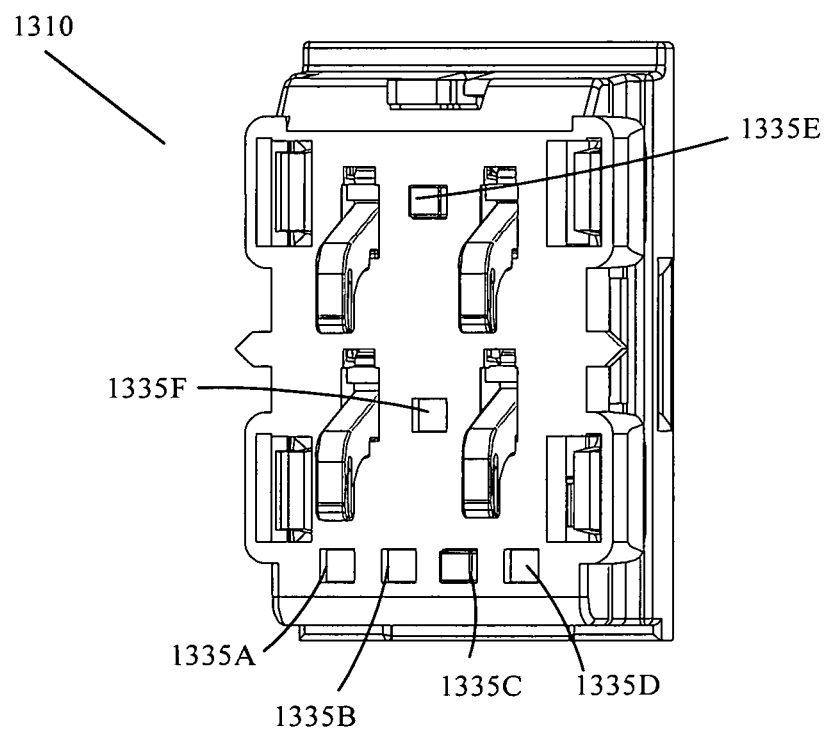
FIG. 16 provides a back view of a cartridge showing the Cross-Insertion Key Feature that are used to house the Key-Pegs.

The Cartridge Housing Frontal-Body shell has Positive Electrical-Terminals 1323 or 1353, the Negative Electrical-Terminals 1322 or 1352 and the Earth Ground Electrical Bus 1321 or 1351 all embedded inside the Frontal-Body shell and from their respective locations, electrical plugs will access the terminals from the Cartridge Housing Front seen in FIGS. 4, 5, 6 and 7 where the plug openings Cartridge face inlet ports 1312, 1342, 1313, 1343 and 1314, 1344 representing the Positive, Negative and Earth Ground entry ports respectively for DCL and DCM-Cartridges, and from there all electrical connections are accessed as the terminal contact constructions seen in FIGS. 12A, B and C illustrate. The other half of the cartridge the Common-Housing Base contains the Terminal-Hooks either the 312 as conductive Terminal-Hooks or the 322 as non-conductive or Plastic Terminal-Hooks. The Terminal-Hooks are arranged according to the cartridge in question.

If the cartridge is a DCL type terminals A and B are the 312 conductive types and terminals C and D are the 322 non-conductive types. The non-conductive Terminal-Hooks are only needed as mechanical anchor points to secure the alignment of the mating of the cartridge to the UEI base for that reason they can be made of plastic. The other conductive Terminal-Hooks make contact internally with the Positive or Negative Electrical Contacts to form the electrical pathway conducting electricity from the UEI to the plugs by way of the Electrical Contacts. If the cartridge is a DCM type, terminals A and C are the 312 conductive type and terminals B, and D are the 322 non-conductive Type.

The Terminal-Hooks are made to engage the UEI where they will be contacting the Terminal-Lugs to perform two principal functions. All of them serve as mechanical anchor points to keep the cartridge secured to the UEI base. The conductive Terminal-Hooks, however, perform both functions, that of being mechanical anchor points, and electrical conductivity points electrically connecting the two units, the UEI and the cartridge together. Since outlet assemblies are subjected to environmental effect where temperature fluctuations will cause expansion and contraction of the components affecting their performance, Hook Terminal-Slits feature 313 and 323 are added the Terminal-Hook. The slits cause the engagement between the Terminal-Hook from the Cartridges or outlets to the Terminal-Lugs inside the UEI to have a spring action engagement when they meet. As such, the spring contact maintains good connectivity between the two parts compensating for changes due to temperature variations.

Engagement of a cartridge is further secured to the UEI base by means of a Grounding-Prong. At the time of insertion of the cartridge, the Grounding-Prong 1324 or 1354 or 1384, depending on the cartridge used, which Prong is located at the uppermost section of the cartridge, engages the bracket, and gets locked within a groove on the bracket securing the cartridge to the bracket, by extension the UEI, and preventing it from being accidentally dislodged. The bracket being connected to earth ground provides conductivity for the cartridge and later to the connected equipment via the Grounding-Prong that is made of a conductive metallic material.

Engagement between UEI and Cartridge is controlled by a protective feature to prevent accidental connection of a DCL-Cartridge to a UEI base intended for a DCM-Cartridge or a DCH-Cartridge. That feature referenced as the Cross-Insertion Key Feature is organized as a matrix arrangement. The keys are made of plastic to either permit or deny access between the Cartridge and the UEI, allowing only Cartridges intended for a correct platform to be able to mate with it. Plastic keys 1332, 1362 and 1392 which are referred to as Key-Pegs are embedded in the back of the Common-Housing section of the cartridge following the matrix found in Table 1 from FIG. 18. From the cartridge, a 1 indicates the presence of a Key-Peg and a 0 indicates its absence. From the UEI the 1 means a Key-Hole or a cavity is present to accept the Key-Peg. If the cavity is 0 or absent, the Key-Peg cannot engage the UEI base and therefore, the connection cannot be established.

Figure 11:
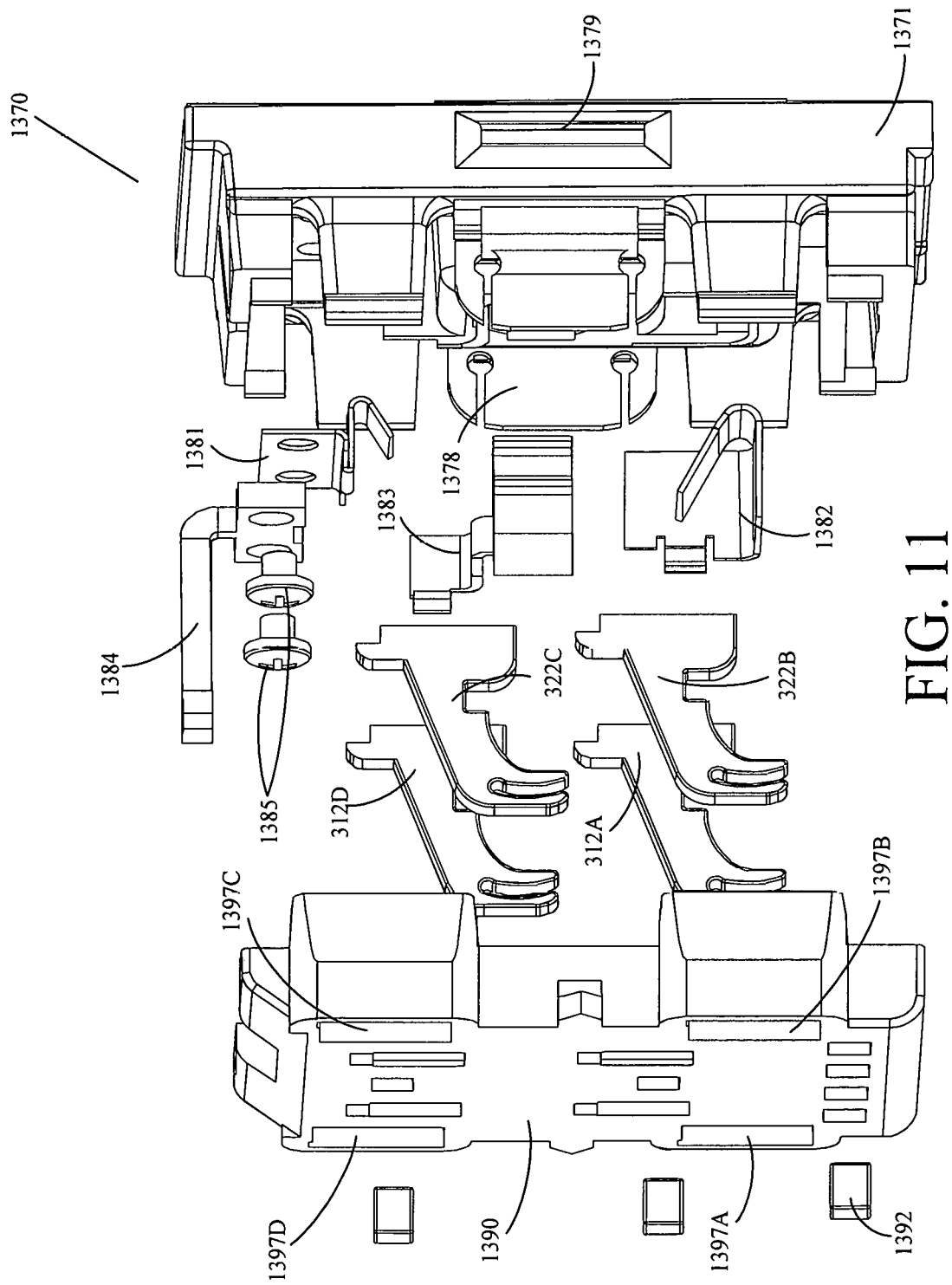
FIG. 11 is an exploded view of a high-level DCH-Cartridge showing its internal components.

DCL-Cartridges and DCM-Cartridges are expected to be the most widely used cartridges and are intentionally adapted to fit standard electrical boxes, as such they have the same form factor and are constructed similarly. Therefore, the construction descriptions provided thus far, cover both models. However, the DCH-Cartridge intended to provide a higher voltage and thus higher power output. It therefore has a slightly differently construction to accommodate excessive heat buildup and its effect on the plastic enclosure, mitigating meltdown and fault in the electrical system. That DCH-Cartridge only has one outlet port as compared to the DCL and DCM having two distinct ports. Because of the slightly modified construction, the components of the DCH although present to perform similar tasks are made of heavier gage metal and can carry larger current. The position of the components is also different as can be seen in FIG. 11. Components such as Positive-Terminal 1383, Negative-Terminal 1382 and Earth Ground Electrical Bus 1381 for that cartridge can be viewed in FIGS. 13 B, C and D respectively.

A special feature employed in the construction of the DC-Cartridge series is found at the face of the cartridges where an Embossed-Outlet is created where the entry points are located. The Embossed-Outlet 1326, 1356 and 1386 for the DCL, DCM and DCH Cartridges respectively will guide the plugs in place and secure their engagement to cartridge base.

Figure 17:
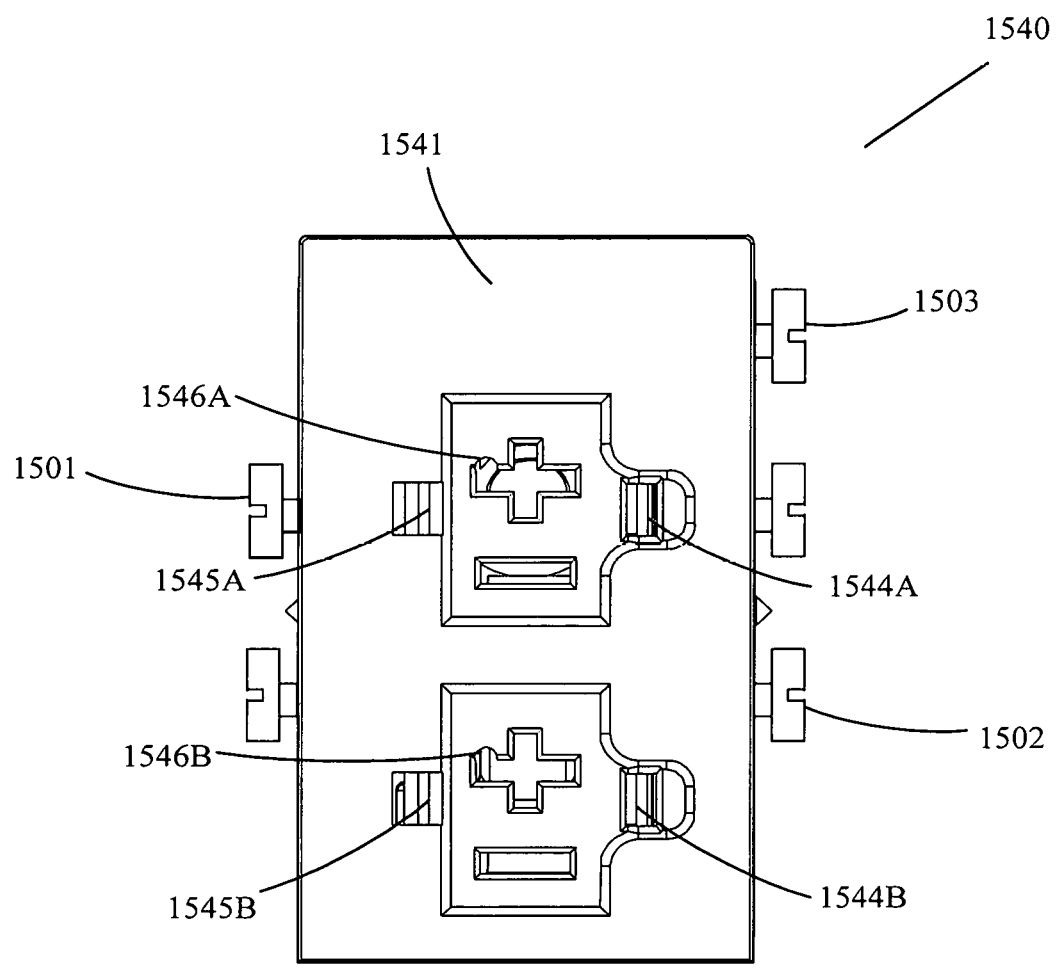
FIG. 17 is a facial representation of a non-UEI base cartridge where DC power can be brought directly to the screws of the cartridge as is done conventionally with other outlets bypassing the need for a UEI. For illustrative purpose, a single mid-size DCM-Outlet is here represented.

The cartridges forming the preferred embodiments of this patent, 1310, 1340 and 1370 are adapted to be used in conjunction with a UEI base. Since the basic construction can be employed for DC delivery without the need for a UEI base, it is understood that a conventional outlet format can be utilized. Thus, FIG. 17 shows a 1540 representation of such an outlet having all the features described from the facial part of the three models discussed previously, but this time connection to a DC power line will be made by way of conventional screws 1502 Outlet Positive Screw, 1503 Outlet Negative Screw and 1504 Outlet Earth Grounding Screw, all located on the sides of the outlets to connect the terminals to the DC power lines. In this representation only a mid-level power outlet like the DCM-Cartridge is represented but similar outlets embracing the features of the DCL, or DCH-Cartridges can be developed.

The practice made of the Direct Connect Homegrid system and components presented in this patent, Direct Connect UEI Cartridge for DC Power Systems, is one of the many ways the Unifying Electrical Interface Platform can be used. Together the UEI and the DC Homegrid represent integral components needed to build a DC infrastructure for use in homes, industrial and commercial environment. The DC-Cartridges are the latest components added to that infrastructure as developed by Ascent-X, a Delaware Company. The option of using the DC without the UEI represents an alternate method of delivery of DC into the home or building. There exist many more ways of making use of this system, either by using each element individually or as a combination thereof that may be derived from this patent and that are not represented in this application. Anyone skilled in the art may easily discern these and/or other aspects not described herein that, in effect, remain and constitute the intent of this patent.

The invention claimed is:

1. A series of DC-Cartridges or DC Outlets as receptacles for DC power delivery and connectivity by way of a Unifying Electrical Interface (UEI) platform or UEI base having Terminal-Lugs, each connected to a line of a DC-Homegrid system or a standalone DC source providing a DCL-Voltage of up to 48V DC, a DCM-Voltage between 49V and up to 96V DC and a DCH-Voltage between 97V and up to 300V DC, each to a Positive-Terminal, and returning via a Negative-Terminal, said UEI base is keyed to accept a specific cartridge or a combination thereof, each DC-Cartridge comprises:

a Frontal-Body shell as an anterior portion of an enclosure forming a cartridge adapted as an outlet for DC power connectivity via electrical contacts embedded inside the enclosure, and said terminal contacts can be accessed to by a corresponding mating power plug by way of entry holes located at the front of each respective DC-Cartridge;

a Common-Housing base as the rearmost portion of the enclosure forming the DC-Cartridge for DC power connectivity, wherein the electrical contacts intended for electrical and/or mechanical connections are included at patterns matching an entry footprint of each respective UEI base;

a Grounding-Prong for grounding and to mechanically secure each respective DC-Cartridge to its UEI base;

a Positive Electrical-Terminal serving as electrical contacts to a positive DC-Voltage line for the respective DC-Cartridge;

a Negative Electrical-Terminal serving as electrical contacts for a negative return line for the respective DC-Cartridge;

an Earth Ground Electrical Bus providing a grounding connection path for all equipment connected to the DC-Cartridge;

a series of Terminal-Hooks as electrical and/or mechanical contacts linking the DC-Cartridge to the UEI base;

a Plug-Lock feature used to protect and secure the corresponding mating power plug.

2. The Frontal-Body shell of claim 1, wherein said shell is made of plastic or non-conductive materials and is comprised of interior cavities necessary to insert all the elements that compose the DC-Cartridge.

3. The Frontal-Body shell of claim 1, wherein said shell has a multiplicity of DC-Cartridge Engagement-Snap features that are used to join the Frontal-Body to a back portion of the DC-Cartridge or the Common-Housing base.

4. The Frontal-Body shell of claim 1, having a facial portion and wherein said facial portion is equipped with one or more outlet port or receptacle entry points through which the corresponding mating power plugs will establish electrical connection with the DC-Cartridge.

5. The Frontal-Body shell of claim 4, wherein said receptacle entry points have a Cartridge Plus-Inlet in the shape of a plus sign to differentiate the UEI DC-Outlet from conventional AC outlets and other DC outlets.

6. The Frontal-Body shell of claim 5, wherein said receptacle entry points have a Cartridge Minus-Inlet entry hole in the shape of a minus sign.

7. The Frontal-Body shell of claim 5, wherein said receptacle entry points have a keyed indentation or Inlet-Key orientation on one leg of the plus sign to accept only plugs with a matching footprint identifying a DC voltage level of said receptacle entry points.

8. The Frontal-Body shell of claim 4, wherein one or more Embossed-Outlet feature is located on the facial portion to facilitate mating of the corresponding mating power plugs.

9. The Cartridge Plus-Inlet and Cartridge Minus-Inlet of claim 6, wherein said Plus-Inlet and/or Minus-Inlet could be of any shape allowing them to be differentiated from conventional AC outlets, said shapes could be a circle, a star, a triangle, a square, a rectangle or any other such differentiating geometric shapes and arrangements.

10. The Common-Housing base of claim 1, wherein said Common-Housing base is made of plastic or the like non-conductive materials and has cavities to allow insertion of the Terminal-Hooks needed to establish electrical connectivity and to secure the assembly to the UEI base.

11. The Common-Housing base of claim 1, wherein said Common-Housing base has a series of Key-Pegs inserted in a series of recessed Key-Holes in a rear of the DC-Cartridge, at a specific pattern matching the DC-Cartridge cartridge type DCL, DCM, or DCH, to protect the DC-Cartridge from being inserted into the UEI base for which it is not intended.

12. The Grounding-Prong of claim 1, wherein the material of the Grounding-Prong is steel or any hard conductive material.

13. The Positive Electrical-Terminal of claim 1, wherein the material of the Positive Electrical-Terminal is copper or any similar conductive material, said Positive Electrical-Terminal is to establish contact with the Terminal-Hook connecting said Positive Electrical-Terminal to a port from the UEI base providing a Positive DC-Voltage.

14. The Negative Electrical-Terminal of claim 1, wherein the material of the Negative Electrical-Terminal is copper or any similar conductive material, said Negative Electrical-Terminal is to establish contact with the Terminal-Hook connecting said Negative Electrical-Terminal to a port from the UEI base providing an electrical return path for the DC-Cartridge.

15. The Earth Ground Electrical Bus of claim 1, wherein the material of the Earth Ground Electrical Bus is copper or any similar conductive material, said Earth Ground Electrical Bus channels protective earth ground to plugs and equipment connected to the DC-Cartridge.

16. The Terminal-Hooks of claim 1, wherein the material of the Terminal-Hooks is copper or similar conductive material when intended as both an electrical and a mechanical terminal.

17. The Terminal-Hooks of claim 1, wherein the material of the Terminal-Hooks is plastic or non-conductive materials when intended as the mechanical contact.

18. The Terminal-Hooks of claim 1, wherein each Terminal-Hook contact has a Hook Terminal-Slit at its flange serving as a mechanical spring to maintain electrical and mechanical contacts between the Terminal-Hooks from the DC-Cartridge and the Terminal-Lugs located inside the UEI base where electrical and mechanical connections are made.

19. The Plug-Lock feature of claim 1, wherein a cavity is provided to engage a locking feature from the corresponding mating power plug preventing easy dislodgement of the corresponding mating power plug and to secure the electrical connection between the DC-Cartridge and the corresponding mating power plug.

20. A series of non-UEI DC-Outlets for DC power delivery and connectivity, each of the non-UEI DC-Outlets comprising:

a shell as an enclosure forming the non-UEI DC-Outlet for DC power connectivity via terminal contacts embedded inside the enclosure and said terminal contacts can be accessed via a plug by way of entry holes or Plus-Inlets and Minus-Inlets located at the front of the non-UEI DC-Outlet;

a Positive-Terminal serving as the terminal contact to a positive voltage line to be connected to the non-UEI DC-Outlet;

a Negative-Terminal serving as the terminal contact to a negative return line to be connected to the non-UEI DC-Outlet;

an Earth Ground Electrical Bus providing a grounding connection path for all equipment connected to the non-UEI DC-Outlet;

a series of screws connecting the Positive-Terminal, the Negative-Terminal and the Earth Ground Electrical Bus, wherein a connection to a DC-Homegrid system or any DC source can be brought directly to the screws.

21. The shell of claim 20, wherein the material used for the non-UEI DC-Outlet is plastic or any non-conductive materials.

22. The shell of claim 20, wherein for providing connectivity from the non-UEI DC-Outlet, the shell contains front receptacles with terminal contacts represented as a keyed plus and a minus signs to differentiate them from conventional AC outlets.

23. The shell of claim 20, wherein a specific indentation on each Plus-Inlet is provided to distinguish the non-UEI DC-Outlet to the DC level available at the non-UEI DC-Outlet.

24. The Positive-Terminal of claim 20, wherein the material of the Positive-Terminal is copper or any similar conductive material.

25. The Negative-Terminal of claim 20, wherein the material of the Negative-Terminal is copper or any similar conductive material.

26. The shell of claim 20, wherein the Plus-Inlet and Minus-Inlet could be of any shape allowing them to be differentiated from conventional AC outlets, said shapes could be a circle, a star, a triangle, a square, a rectangle or any other such differentiating geometric shapes and arrangements.

27. The Earth Ground Electrical Bus of claim 20, wherein the material of the Earth Ground Electrical Bus is copper or any similar conductive material, said Earth Ground Electrical Bus channels protective earth ground to plugs or equipment connected to the non-UEI DC-Outlet DC.

28. The series of screws of claim 20, wherein the screws are conductive and are made of copper or Stainless Steel or any similar conductive materials.

* * * * *